(12) United States Patent
Snapir et al.

(10) Patent No.: US 9,325,371 B2
(45) Date of Patent: Apr. 26, 2016

(54) METHOD FOR MANAGING DATA TRANSPORT USING CROSSTALK DATA

(71) Applicant: ECI Telecom Ltd., Petach Tikva (IL)

(72) Inventors: Dor Snapir, D.N. Lachish Zafon (IL); Ilan Sharfer, Rehovot (IL); Gil Trefler, Beer Sheva (IL)

(73) Assignee: ECI TELECOM LTD., Petach Tikva (IL)

( * ) Notice: Subject to any disclaimer, the term of this patent is extended or adjusted under 35 U.S.C. 154(b) by 218 days.

(21) Appl. No.: 14/097,453

(22) Filed: Dec. 5, 2013

(65) Prior Publication Data

US 2014/0153377 A1 Jun. 5, 2014

(30) Foreign Application Priority Data

Dec. 5, 2012 (IL) .......................................... 223454

(51) Int. Cl.

| | |
|---|---|
| *G01R 31/08* | (2006.01) |
| *H04L 5/14* | (2006.01) |
| *H04L 12/66* | (2006.01) |
| *H04B 3/32* | (2006.01) |
| *H04M 3/36* | (2006.01) |
| *H04M 3/428* | (2006.01) |
| *H04J 3/10* | (2006.01) |
| *H04M 3/493* | (2006.01) |
| *H04M 3/22* | (2006.01) |

(52) U.S. Cl.
CPC ... *H04B 3/32* (2013.01); *H04J 3/10* (2013.01); *H04M 3/2209* (2013.01); *H04M 3/367* (2013.01); *H04M 3/4283* (2013.01); *H04M 3/493* (2013.01)

(58) Field of Classification Search
CPC .............. H04J 3/10; H04J 1/12; H04B 3/464; H04M 3/2209; H04M 3/367
See application file for complete search history.

(56) References Cited

U.S. PATENT DOCUMENTS

| | | | |
|---|---|---|---|
| 9,100,176 B2 * | 8/2015 | Kanellakopoulos | ..... H04B 3/36 |
| 2008/0089436 A1 * | 4/2008 | Oksman | ............ H04L 25/03343 375/296 |
| 2008/0130478 A1 * | 6/2008 | Schenk | .................... H04B 3/32 370/201 |
| 2011/0222611 A1 * | 9/2011 | Lindqvist | ................. H04B 3/32 375/257 |

* cited by examiner

*Primary Examiner* — Faruk Hamza
*Assistant Examiner* — Abu-Sayeed Haque
(74) *Attorney, Agent, or Firm* — Browdy and Neimark, PLLC

(57) ABSTRACT

A method and device are provided for affecting data conveyance within a cable comprising a plurality of copper wire lines. The method comprises: providing information about crosstalk interference experienced by the copper wire lines; for each copper wire line experiencing crosstalk interference (interfered line), identifying which other copper wire lines induce crosstalk interference to that interfered line; partitioning the copper wire lines into interference groups, where each interference group comprises at least one copper wire line, wherein at least one of the interference groups comprises at least three copper wire lines, and wherein in case that a given interference group comprises more than two copper wire lines, then each of the copper wire lines belonging to that interference group is subjected to interference induced by another copper wire line that belongs to that interference group; and based on the partitioning step, changing operational settings of at least one copper wire line.

12 Claims, 3 Drawing Sheets

METHOD FOR MANAGING DATA TRANSPORT USING CROSSTALK DATA

CROSS-REFERENCE TO RELATED APPLICATIONS

This application claims priority of Israel Patent Application No. 223454, filed Dec. 5, 2012, the disclosure of which is incorporated by reference herein in its entirety.

TECHNICAL FIELD

The present invention generally relates to improving the performance of communication access networks and more particularly to dynamic spectrum management of communication access networks.

BACKGROUND

Digital Subscriber Line (DSL) is a technology that is used to convey high-bandwidth consuming data, such as Internet to subscribers, over ordinary twisted pair copper wire telephone lines. Due to the increasing number of services and applications which require transmission of data along DSL communication lines, there is an ever-growing demand to increase the bandwidth for transmissions and the transmission rates. The signal-to-noise ratio (SNR) of the communication lines has a strong adverse effect upon the performance of a broadband network. Crosstalk is considered to be a major source of noise in DSL systems, thereby affecting the SNR experienced along the communication link.

Crosstalk is a phenomenon by which one twisted pair generates electromagnetic interference onto another twisted pair, normally when the two pairs run in proximity to each other. When a signal passes through one twisted pair it may be adversely influenced by the crosstalk originated in another twisted pair. Accordingly the signal may be misinterpreted at the receiving side, which in turn would lead to errors in the digital bit stream. It is possible that some twisted pairs interfere with a number of twisted pairs but do not interfere with other twisted pairs belonging to the same cable. A typical DSL cable contains several binders grouped together to form a cable, where a binder is used to bundle multiple insulated copper pairs together in the communication network.

Even though the copper wires in each binder are manufactured in a way that reduces crosstalk, Far End Crosstalk (FEXT) may still occur. FEXT is the result of signals transmitted at one end of the cable, and being coupled at the far end of the cable. In VDSL2 technology, mainly used in broadband DSL networks, FEXT is the main source of crosstalk due to the Frequency Division Duplexing (FDD) used to combine downstream and upstream transmissions at a single twisted pair. Dynamic Spectrum Management (DSM) is used among other things to reduce interferences within a DSL network. The crosstalk problem is particularly felt in lines that are close to each other in a binder, for example in a binder of 25 lines within a 100 lines cable.

Several solutions and DSM methods which are known in the art deal with the adverse effect of the crosstalk. For example, US published application No. 2011222611 discloses a method for managing transmission resources in a DSL system for minimizing cross-talk interference in a cable or cable binder of the access network comprising N lines. The method describes determining a set of relevant lines comprising lines that create interference for a particular line, and applying, for that particular line, an algorithm for resource management using the determined relevant lines' set. However since the method disclosed in this publication considers one particular line at a time, it does not address the problem which the present invention seeks to address, namely, how to identify groups of lines having mutually strong interference. It could be for example that line No. 1 is mainly affected by line No. 2 and line No. 3, whereas line No. 2 is mainly affected by line No. 4 and line No. 5. Yet, this information cannot be used in accordance with the teaching of US 2011222611 to partition the lines into groups. Hence the solution described by this publication does not enable further reduction of the computational resources for carrying out DSM algorithms, nor can it be used to assist the network operator in providing and managing the DSL service.

The known methods fail to provide an adequate and comprehensive enough solution to the crosstalk problem, and the present invention seeks to provide a solution that overcomes the limitations of the prior art methods.

SUMMARY OF THE DISCLOSURE

The disclosure may be summarized by referring to the appended claims.

It is an object of the present disclosure to provide a method for managing data being conveyed within a cable.

It is another object of the present disclosure to provide a method for identifying the arrangement of copper wire lines within a communication cable by using mutual crosstalk data.

It is yet another object of the present disclosure to provide a method that enables management of traffic being conveyed within a cable comprising a plurality of copper wire lines.

It is still another object of the present disclosure to provide a method for optimizing performance of crosstalk cancellation.

It is another object of the disclosure to provide a method that enables to detect faults in a cable.

Other objects of the disclosure will become apparent as the description proceeds.

According to a first aspect there is provided a method for affecting conveyance of data within a communication cable which comprises a plurality of copper wire lines, the method comprising the steps of:

providing information which relates to crosstalk interference experienced by each one of the plurality of copper wire lines;

for each one of the plurality of copper wire lines experiencing crosstalk interference thus being an interfered line, identifying which of the other copper wire lines comprised in the plurality of copper wire lines induce crosstalk interference (preferably substantial interference) to the respective interfered line;

partitioning the plurality of copper wire lines into a plurality of interference groups, wherein each of the interference groups comprises at least one copper wire line, wherein at least one of the interference groups comprises at least three copper wire lines and wherein if a given interference group comprises more than two copper wire lines, then each of the copper wire lines belonging to that given interference group is subjected to interference (preferably substantial interference) induced by at least one other copper wire line that belongs to that very same interference group; and based on the partitioning of the plurality of copper wire lines into a plurality of interference groups, changing operational settings of at least one of the plurality of copper wire lines comprised in the communication cable, thereby affecting the conveyance of data along the communication cable.

In accordance with another embodiment, the one or more interference groups are used to minimize DSP resources and internal communication bandwidth that are needed to enable crosstalk cancellation to a predetermined level, e.g. by cancelling crosstalk only between members of each interference group, and not between members of different interference groups.

The term "copper wire line", sometimes also referred to simply as "line" as used herein and throughout the specification and claims, is used to denote a conductor or transmission line designed to carry electrical signals, for example unshielded twisted-pair copper wires. A regular communication cable comprises several binders each comprising a plurality of copper wire lines.

In accordance with another embodiment, the step of providing information which relates to crosstalk interference experienced by each one of the plurality of copper wire lines, further comprises determining for any given one of the plurality of copper wire lines, whether at least one of its interfering copper wire lines induces crosstalk interference at a level that exceeds a pre-defined threshold. If none of the interfering copper wire lines induces crosstalk interference to such a given interfered copper wire line at a level that exceeds a pre-defined threshold, then that given copper wire line will be included in an interference group that does not include any other copper wire line.

By yet another embodiment, if a given interference group comprises more than two copper wire lines, all the copper wire lines that induce interference (preferably, substantial interference) to any given copper wire line of that interference group, also belong to that interference group.

According to another embodiment, the communication cable is a Digital Subscriber Line ("DSL") cable comprising several binders, wherein each binder comprises a plurality of copper wire lines, and wherein no knowledge on the arrangement of the plurality of copper wire lines within that communication cable is known prior to implementing the method provided by the present disclosure.

Preferably, the method further comprises the step of selecting one or more interference groups from among the plurality of interference groups, wherein the number of the selected interference groups is less than the number of interference groups included in the plurality of interference groups, and wherein the step of changing operational settings of at least one of the plurality of copper wire lines comprised in the communication cable is carried out based on information which relates to the selected interference groups.

According to another related embodiment, the criterion for selecting the one or more interference groups from among the plurality of interference groups is performance degradation within a certain interference group and/or correlated errors between members of the group.

According to yet another embodiment, the method further comprises a step of assigning to each copper wire line an ID number associated with the respective interference group with which it is associated.

According to another aspect, there is provided a device operative to manage data being conveyed within a Digital Subscriber Line (DSL) cable comprising a plurality of copper wire lines, the device comprising a processor adapted to:

receive information (e.g. results of measurements) that relates to interference experienced by each copper wire line of the plurality of copper wire lines;

identify, for each copper wire line that is being interfered, which one or more copper wire lines induce interference thereto;

partition the plurality of copper wire lines into a plurality of interference groups, wherein each of the interference groups comprises at least one copper wire line, wherein at least one of the interference groups comprises at least three copper wire lines, and wherein if a given interference group comprises more than two copper wire lines, then each of the copper wire lines belonging to that given interference group is subjected to interference (preferably substantial interference) induced by at least one other copper wire line that belongs to that very same interference group; and adjust operational settings in at least one copper wire line, based on the partitioning of the plurality of copper wire lines into a plurality of interference groups.

In accordance with another embodiment, the processor is adapted to receive information which relates to crosstalk interference experienced by each one of the plurality of copper wire lines, and to determine for any given one of the plurality of copper wire lines, whether at least one of its interfering copper wire lines induces crosstalk interference at a level that exceeds a pre-defined threshold. If none of the interfering copper wire lines induces crosstalk interference to such a given interfered copper wire line at a level that exceeds a pre-defined threshold, then the processor is operative to include that given copper wire line in an interference group that does not include any other copper wire line.

By yet another embodiment, if a given interference group comprises more than two copper wire lines, the processor is adapted to include all the copper wire lines that induce interference to a given copper wire line of that interference group, at the same interference group.

In accordance with another embodiment, the processor is operative to partition the plurality of copper wire lines into a plurality of interference groups based upon interference relationship between the copper wire lines and/or the interference level therebetween.

Preferably, the processor is further operative to select one or more interference groups from among the plurality of interference groups, wherein the number of the selected interference groups is less than or equal to the number of interference groups included in the plurality of interference groups, and wherein the processor is further operative to apply the selected interference groups for adjusting operational settings of at least one of the copper wire lines for conveying of data along the communication cable.

According to another related embodiment, the criterion for selecting the one or more interference groups from among the plurality of interference groups is performance degradation within a certain interference group and/or correlated errors between members of the group.

BRIEF DESCRIPTION OF THE DRAWINGS

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a thorough understanding of the present invention. It should be apparent, however, that the present invention may be practiced without these specific details. Monitoring of an interference group which shows performance degradation or correlated errors will assist the operator to identify strong disturbers affecting their neighbors in the group.

Figure 1:
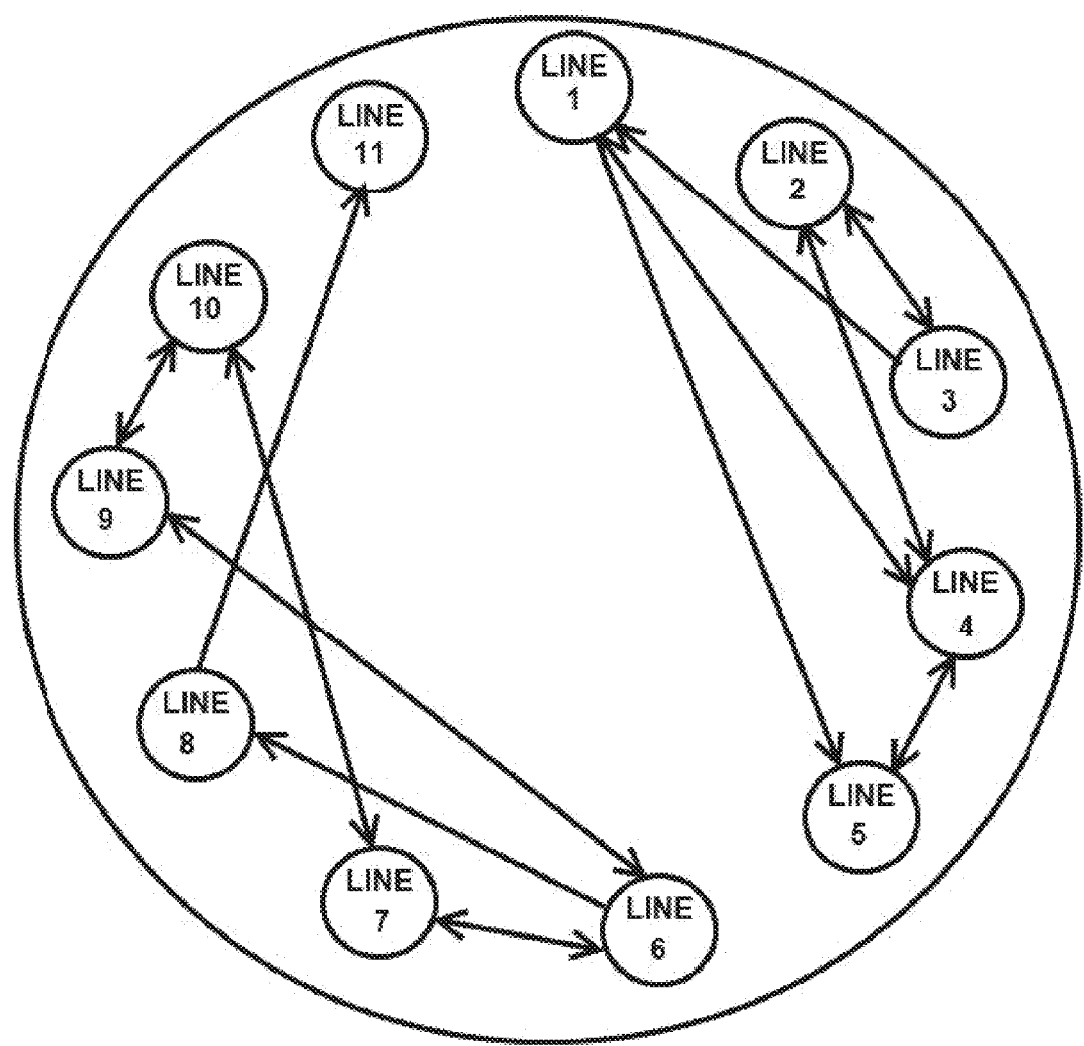
FIG. 1—is a schematic diagram of a simplified binder comprising eleven lines, in which the interference relationship between the eleven different copper wire lines belonging to the same binder is illustrated.

FIG. 1 illustrates a schematic diagram of a simplified binder comprising eleven lines and the interference relationship between these eleven different lines included in that binder. The arrows used in this FIG. indicate the interference induced by one line onto the other. Given the interference relationship as shown in this FIG., according to an embodiment of the present invention, two interference groups are identified:

A first interference group (ID 1) to which lines 1, 2, 3, 4 and 5 belong; and A second interference group (ID 2) to which lines 6, 7, 9 and 10 belong.

The association of lines 8 and 11 either to the second group or to yet another group may depend on the level of the interference experienced by these lines. If they are subjected to a high level of interference, they will be associated according to this example with the second interference group. Otherwise, they will each constitute an interference group of their own. In other words, in the latter case the binder will include two additional interference groups. A third interference group (ID 3) will include line 8, and a forth interference group (ID 4) will include line 11. As may be seen from this figure, it may very well be that some lines associated with a given interference group will interfere with some of the lines belonging to the same interference group but will not interfere with other lines belonging to the very same interference group. For example, in the first interference group no direct interference is induced between line 3 and line 5, but according to this example they are both included at the same interference group since line 3 induces interference to line 1 while line 1 induces interference to line 5.

Figure 2:
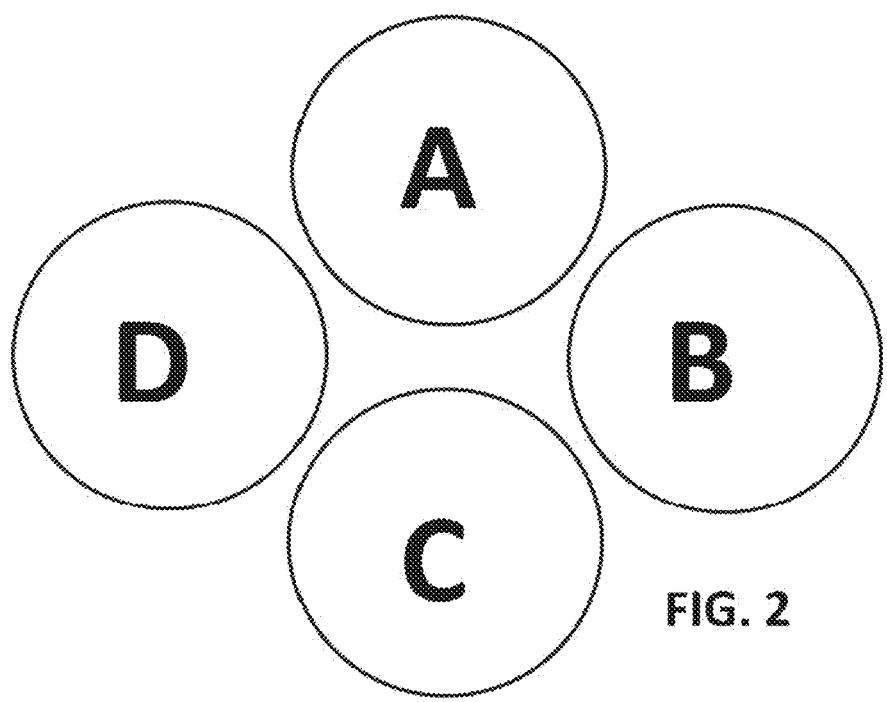
FIG. 2—illustrates a schematic diagram of a cable comprising four binders.

In addition to the intra-binder interference that was described and illustrated in FIG. 1, there may be an inter-binder interference. FIG. 2 illustrates a schematic view of a cable comprising four binders (A, B, C and D) wherein each binder comprises 25 lines.

Figure 3:
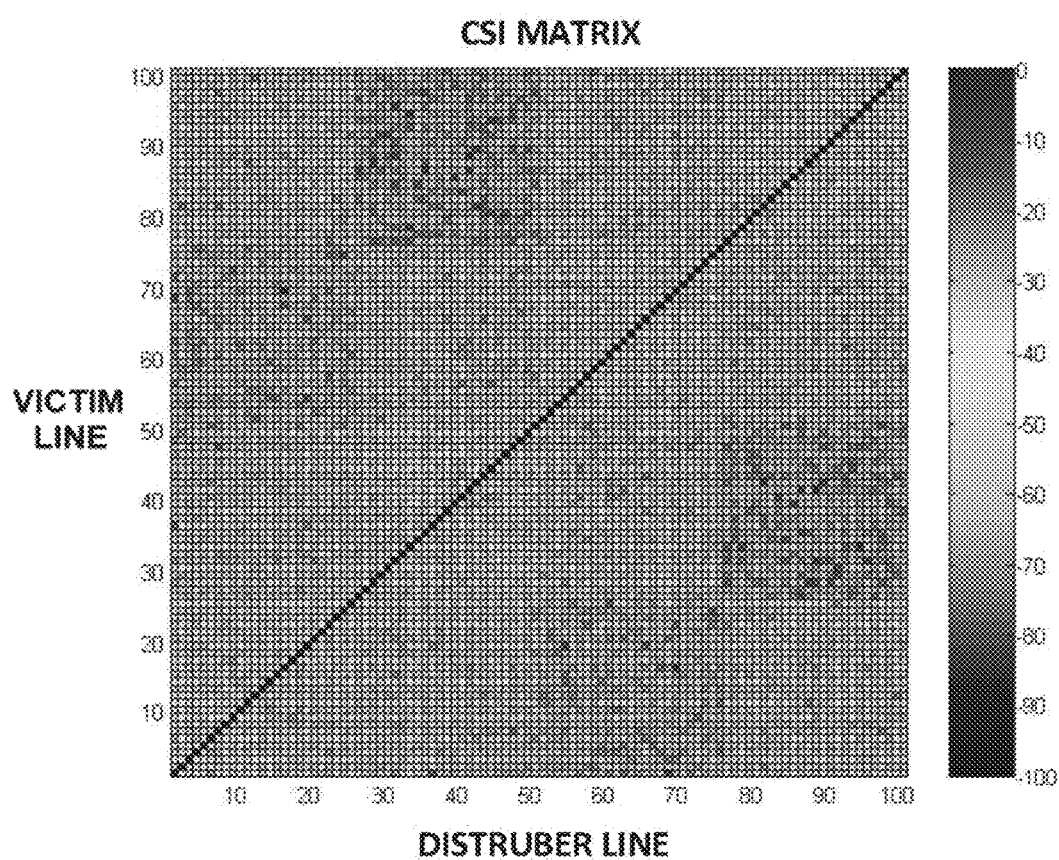
FIG. 3—demonstrates a matrix plot illustrating the crosstalk strength of 100 copper wire pairs of a NIPP-NAI reference crosstalk model corresponding to the four binders arranged as presented in FIG. 2.

FIG. 3 is a 100×100 matrix plot illustrating the crosstalk strength of 100 pairs arranged in accordance with the NIPP-NAI (i.e. Network Interface, Power and Protection-Network Access Interfaces) statistical reference crosstalk model, in four binders as shown in FIG. 2.

As aforesaid, the lines in the matrix belong to 4 binders comprising 25 twisted pairs each. Lines 1-25 belong to binder A, lines 26-50 belong to binder B, lines 51-75 belong to binder C and lines 76-100 belong to binder D. the interference level is represented by the value assigned to the Crosstalk Strength Indicator (CSI). Each line may interfere with all the other lines except itself, which explains why the A(i,i) elements of the matrix are blackened. The four 25×25 squares in this FIG. having the highest CSI values ([1-25, 1-25], [26-50, 26-50], [51-75, 51-75] and [76-100, 76-100] resulting from intra-binder interferences. Inter-binder interferences are also shown in the matrix and it is very easy to visually distinguish between pairs belonging to binders that are adjacent to each other (e.g. A-B, A-D) versus pairs that belong to binders that are opposite to each other (e.g. A-C, B-D). Generally speaking, the interference level in adjacent binders (e.g. [1-25, 26-50], [1-25, 76-100]) is higher than the interference in opposite binders (e.g. [1-25, 51-75], [26-50, 76-100]).

The present invention aims to provide viable information for communication cables comprising copper wire lines arranged in an unknown arrangement, by analyzing the mutual crosstalk existing between lines extending along the cable. The unknown arrangement can be modeled by a graph, wherein each line is represented by a vertex (or node) and the crosstalk coupling between each pair of lines is represented by a weighted edge. According to one embodiment, the method provided enables identifying tightly connected groups of vertices or clusters in the graph.

There are two main approaches to solve clustering problems, a vector based approach and a graph based approach. The following description is a non-limiting explanation of a way to implement a method of spectral graph clustering to identify groups of copper wire lines. The main idea is to build a weighted graph in which the vertices correspond to data points and the edges are related to the distances between the points. The top k eigenvectors of a matrix derived from these weights can be used for partitioning the graph to clusters by any grouping algorithm known in the art per se. In the example of a basic grouping algorithm referred to hereinbelow, the distances are associated with mutual Crosstalk Strength Indicator (CSI) between the lines. Thus, a strong CSI (i.e. a value that is close to 1) corresponds to points that are relatively near each other, while a weak CSI (i.e. a value close to 0) corresponds to points that are relatively far from each other.

The following example demonstrates one way of carrying out a basic grouping process:

Given a set a points $S=\{s_1, \ldots, s_N\}$ which correspond to N lines that are intended to be partitioned into k clusters:

1. Form an affinity matrix A defined by $A_{ij}=CSI_{ij}$ if $i \neq j$, and $A_{ii}=0$. The index i denotes a victim (i.e. a line being interfered) and the index j denotes the disturber (i.e. a line that interferes with another).
2. Define D to be the diagonal matrix whose (i,i) element is the sum of A's i-th row, and construct the Laplacian matrix L where $L=D^{-1/2} AD^{-1/2}$.
3. Find $x_1, x_2, \ldots, x_k$, the k largest eigenvectors of L (chosen to be orthogonal to each other in case of repeated eigenvalues), and form the N×k real matrix $X=[x_1, x_2, \ldots, x_k]$ by stacking the eigenvectors in columns.
4. Deriving matrix Y from X by normalizing each row of X to have unit length, i.e.

$$Y_{ij}=X_{ij}/(\Sigma_j X^2_{ij})^{1/2}$$

5. Treating each row of Y as a k-dimensional real vector, cluster them to k-clusters with the K-means or similar algorithms, to try minimizing the distortion between the center of each cluster to each member of the cluster.
6. Assign the original point $s_i$ to cluster j if and only if row i of the matrix Y was assigned to cluster j.

The process demonstrated above is an example of a basic grouping process. The present disclosure provides additional modifications to the basic algorithm in order to consider certain situations which are excluded from the scope of such a basic process.

For example, in the basic process the affinity matrix is real and symmetric, therefore it is guaranteed that the eigenvalues and eigenvectors are real. However, this is not the case when the matrix is asymmetric, as it is in the vectoring application. Thus, it may happen that the eigenvalues and eigenvectors are complex valued. In this case the clustering step 5 will fail when the standard K-means algorithm is used, because this algorithm is not designed to operate on complex valued vectors as an input. Therefore, an initial pre-conditioning step is provided by the present invention. In this step, the original CSI data which forms the affinity matrix is modified in a controlled manner until no complex eigenvalues appear between the k top eigenvalues. Since the number of clusters is not known in advance, the basic clustering algorithm should be executed with several values of k, giving multiple solutions for the vectoring groups. Consequently, it is recommended to select between several candidates for the number of clusters identified and the members in each cluster. Criteria for selection may be for example that the centroids (centers of gravity) of the clusters are approximately in angles of 90° with respect to each other, and that the actual number of centroids found is equal to the number of clusters. In addition, in order to choose between several successful clustering candidates, the second largest eigenvalue of the affinity matrix of each cluster is examined. Smaller second eigenvalues indicate better clustering.

Figure 4:
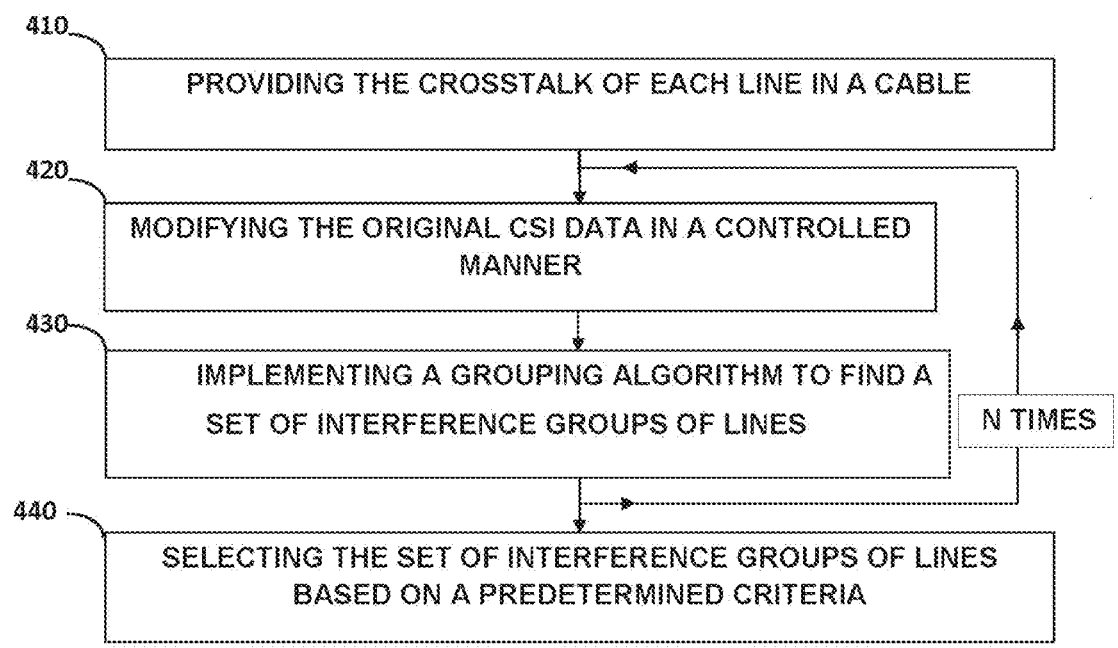
FIG. 4—is a flow chart that demonstrates an embodiment of a process for identifying the interference groups in a case of a communication cable in which the arrangement of the copper wire lines is unknown prior to implementing this embodiment.

FIG. 4 is a flow chart demonstrating a process of identifying interference group(s) in case of a communication cable comprising copper wire lines arranged in an unknown arrangement. The process starts by providing crosstalk information which relates to each line in a cable (step 410), then modifying the original CSI data in a controlled manner until no complex eigenvalues appear between a certain k eigenvalues (step 420). After having k real eigenvalues, implementing a grouping algorithm to find a set of groups of lines (step 430) each group having mutually high CSI. Steps 420 and 430 are repeated for a number of times in order to obtain a plurality of clustering trials. Preferably, the difference between each iteration is that we search for a partition into n interference groups n=1, 2, . . . N., and finally select n and the actual partitioning in block 440. Next, n and the actual partitioning, i.e. the number of interference groups of lines and the members of each group, are selected (step 440) based upon satisfying the clustering criteria and the quality of clustering as explained above.

Having determined the one or more interference groups, the operator may now configure the system so that the DSP (digital signal processing) resources and internal communication bandwidth needed to carry out crosstalk cancellation to a predetermined level, are minimized, e.g. by cancelling crosstalk only between members of each interference group, while avoiding the need to carry out crosstalk cancellation between members of different interference groups. Additionally, the interference group may be monitored jointly, thereby facilitating the detection and/or isolation of faults, each affecting several lines of an interference group.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for affecting conveyance of data within a communication cable which comprises a plurality of copper wire lines, the method comprising the steps of:
    providing information which relates to crosstalk interference experienced by each of the plurality of copper wire lines;
    for each of the plurality of copper wire lines experiencing crosstalk interference, thus being an interfered line, identifying which of the other copper wire lines comprised in the plurality of copper wire lines, induce crosstalk interference to the respective interfered line;
    partitioning the plurality of copper wire lines into a plurality of interference groups, wherein each of the interference groups comprises at least one copper wire line, wherein at least one of the interference groups comprises at least three copper wire lines, and wherein in case a given interference group comprises more than two copper wire lines, then each of the copper wire lines belonging to that given interference group is subjected to interference induced by at least one other copper wire line that belongs to that very same interference group;
    based on the partitioning of the plurality of copper wire lines into a plurality of interference groups, changing operational settings of at least one of the plurality of copper wire lines comprised in the communication cable, thereby affecting the conveyance of data along the communication cable; and
    wherein said method further comprising a step of selecting one or more interference groups from among the plurality of interference groups, wherein the number of the selected interference groups is less than or equal to the number of interference groups included in the plurality of interference groups, and wherein the step of changing operational settings of at least one of the plurality of copper wire lines comprised in the communication cable is carried out based on information which relates to the selected interference groups.

2. The method of claim 1, wherein the step of providing information which relates to crosstalk interference experienced by each one of the plurality of copper wire lines, further comprises determining for any given one of the plurality of copper wire lines, whether at least one of its interfering copper wire lines induces crosstalk interference at a level that exceeds a pre-defined threshold.

3. The method of claim 2, wherein in case that none of the interfering copper wire lines induces crosstalk interference to said given copper wire line at a level that exceeds said pre-defined threshold, determining that said given copper wire line will be included in an interference group that does not include any other copper wire line.

4. The method of claim 1, wherein in case that a given interference group comprises more than two copper wire lines, all the copper wire lines that induce interference to any given copper wire line belonging to said interference group, also will be included in said interference group.

5. The method of claim 1, wherein said communication cable is a Digital Subscriber Line ("DSL") cable comprising several binders, and wherein each binder comprises a plurality of copper wire lines, and wherein no knowledge on the arrangement of said plurality of copper wire lines within said communication cable is known prior to implementing said method.

6. The method according to claim 1, wherein the criterion for selecting the one or more interference groups from among the plurality of interference groups is performance degradation within a certain interference group and/or correlated errors between members of the group.

7. The method of claim 1, further comprising a step of assigning to each copper wire line an ID number associated with the respective interference group to which it is associated.

8. device operative to adjust setting for conveying data in one or more copper wire lines extending within a Digital Subscriber Line (DSL) cable which comprises a plurality of copper wire lines, the device comprising a processor adapted to:
 receive information that relates to interference experienced by each copper wire line of the plurality of copper wire lines;
 identify, for each copper wire line that is being interfered, which one or more copper wire lines induce interference thereto;
 partition the plurality of copper wire lines into a plurality of interference groups, wherein each of the interference groups comprises at least one copper wire line, wherein at least one of the interference groups comprises at least three copper wire lines, and wherein in case that a given interference group comprises more than two copper wire lines, then each of the copper wire lines belonging to that given interference group is subjected to interference induced by at least one other copper wire line that belongs to that very same interference group;
 adjust operational settings in at least one copper wire line, based on the division of the plurality of copper wire lines into a plurality of interference groups; and
 wherein said processor is further operative to select one or more interference groups from among the plurality of interference groups, wherein the number of the selected interference groups is less than or equal to the number of interference groups included in the plurality of interference groups, and wherein the processor is further operative to apply the selected interference groups for adjust operational settings of at least one of the copper wire lines for conveying of data along the communication cable.

9. The device of claim 8, wherein said processor is adapted to receive information which relates to crosstalk interference experienced by each one of the plurality of copper wire lines, and to determine for any given one of the plurality of copper wire lines, whether at least one of its interfering copper wire lines induces crosstalk interference at a level that exceeds a pre-defined threshold.

10. The device of claim 9, wherein the processor is operative to include said given copper wire line in an interference group that does not include any other copper wire line, in case that none of the interfering copper wire lines induces crosstalk interference to said given copper wire line at a level that exceeds a pre-defined threshold.

11. The device of claim 8, wherein in case that a given interference group comprises more than two copper wire lines, the processor is adapted to include all the copper wire lines that induce interference to a given copper wire line of that interference group, at said given interference group.

12. The device according to claim 8, wherein the selecting of one or more interference groups from among the plurality of interference groups is based on detecting performance degradation within an interference group and/or correlated errors between members of such a group.

* * * * *